Dec. 1, 1964 P. N. LEHR ETAL 3,159,717
CHIME SIGNAL REGULATOR
Filed July 7, 1960
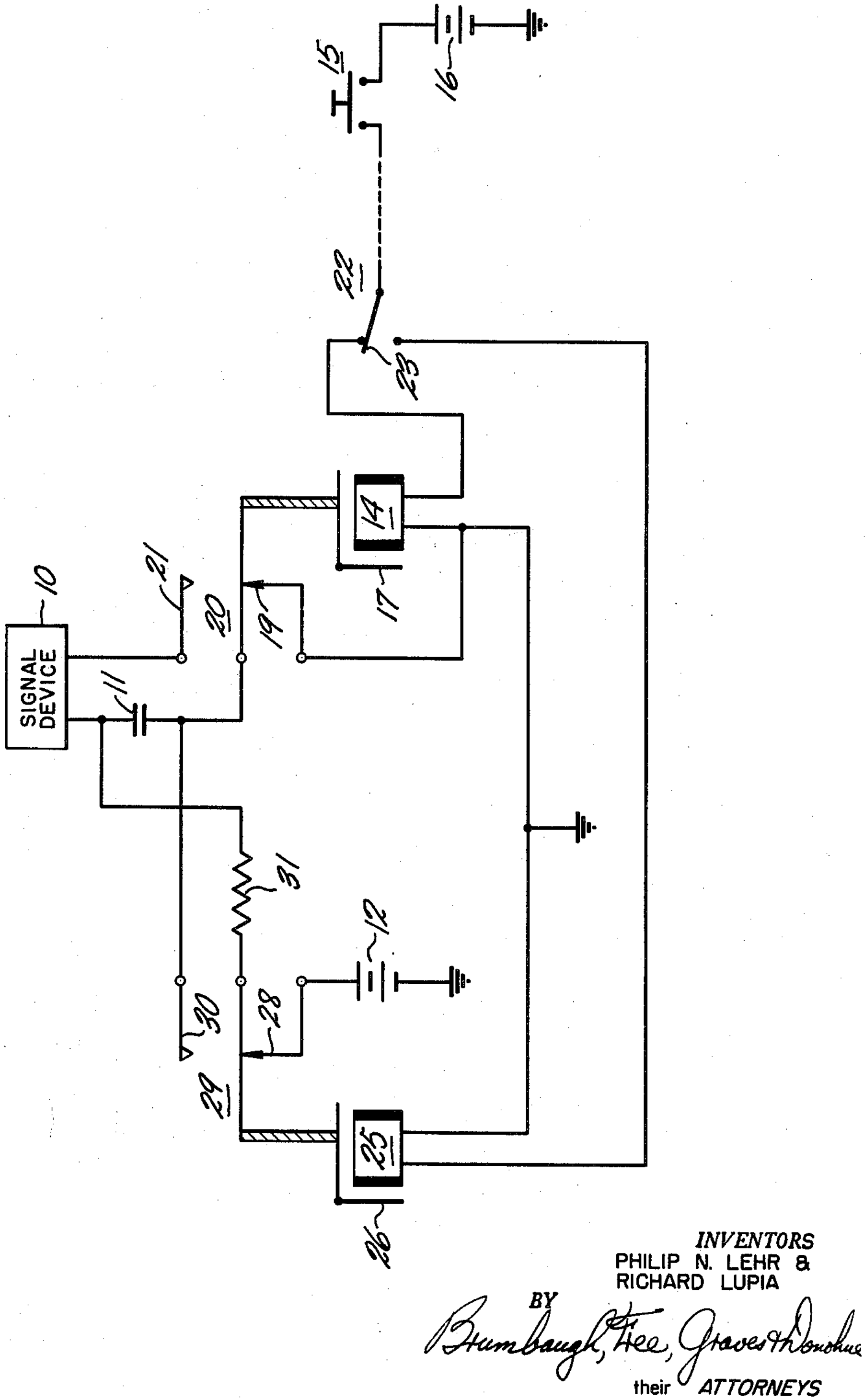
INVENTORS
PHILIP N. LEHR &
RICHARD LUPIA
BY
Brumbaugh, Free, Graves & Donohue
their ATTORNEYS 3,159,717

CHIME SIGNAL REGULATOR

Philip N. Lehr, Huntington, and Richard Lupia, New Hyde Park, N.Y., assignors to Dictograph Products, Inc., Jamaica, N.Y., a corporation of Delaware Filed July 7, 1960, Ser. No. 41,327
6 Claims. (Cl. 179—84)

The present invention relates to call signal systems, and, more particularly, to a novel and improved signal control system for controlling a signal device for a called party under the control of the calling and called parties.

Most types of communication systems include various forms of means for registering or indicating a call from one party in the system to another party. In conventional telephone systems, for example, when one party calls another party, ringing current is applied to the line to operate a calling device at the location of the called party. It is customary in these systems to have the calling or signal device continuously operative until the called party answers or the calling party discontinues any further effort to place the call. In intercommunication systems within an office, it is desirable to control a call signal device in such manner that the device is initially operated when the call is made but does not continue to operate during the remaining interval before the called party answers. This is especially desirable in the case of audible signal means which would be unnecessarily disturbing.

In accordance with the invention, there is provided a signal control system for controlling a signal device for indcating a call established by a call registering means to a called party which is controlled by both the calling and called parties. The system includes a signal device for indicating the call, a selectively operable electrical discharge means for controlling the signal device, means under the control of the calling party for rendering the discharge means operative to control the signal device to indicate a call, and means responsive to the call registering means for preventing continuous operation of the signal device after an initial operation thereof.

Means are also provided, in accordance with the invention, for discharging the electrical discharge means when the called party answers and for preventing the reestablishment of a charge in the electrical discharge means during the time that the called party is answering and the call registering means is operative. Further, when the call is completed, the signal device will not be operated regardless of whether the called party or the calling party causes the call to be terminated. This eliminates the annoyance of ring-back at the completion of calls.

For a more complete understanding of the invention, reference may be had to the following detailed description taken in conjunction with the accompanying figure of the drawing, which is an electrical schematic diagram of a signal control system in accordance with the invention.

In this figure, a signal device 10, which may have any suitable conventional form, capable of being controlled by an electrical discharge device, is adapted to be connected across the output of an electrical discharge device 11, which may be in the form of a suitable electrical capacitor. The signal device 10, while preferably an audible device such as a chime or bell may also take the form of a flashing light, flag signal, or any other suitable means for indicating a registration of a call.

In its nonoperative state, i.e., a call has not been registered, the electrical discharge device 11, is coupled across its terminals to a suitable source of potential 12 capable of charging the electrical discharge means to a predetermined charge level.

When a calling party wishes to register a call, a relay 14 is energized by the completion of a connecting circuit through a call registering means 15 at the location of the calling party to a potential source 16, for example, a battery, which may be located either at the location of the calling party or the called party. The call registering means 15 may take any suitable conventional form whereby the circuit from the potential source 16 to the relay 14 would be completed.

In the exemplary embodiment, when the relay 14 is energized by the potential source 16, an armature 17 is drawn inwardly and a break contact 19 in a first switching means 20 is opened either directly or by suitable mechanical linkage to interrupt a charging circuit for the electrical discharge means 11. At the same time, or immediately thereafter, a make contact 21 in the switching means closes to place electrical discharge means 11 in discharge relation across the signal device 10, thereby controlling the operation of that device. As long as the call registering means 15 remains operative, the relay 14 is energized, the electrical discharge means 11 is maintained across the signal device 10, and the charging circuit for the electrical discharge means 11 is interrupted. As the electrical discharge means 11 is initially placed across the signal device 10, a current flow is established to control the operation by the device 10 by the electrical discharge means 11. However, this discharge current rapidly decays and the signal device 10 is no longer operated even though the electrical discharge device 11 remains directly connected to it. Thus, for any single call, the signal device 10 is operative once only.

Of course, if, before the called party answers, the calling party releases the call registering means 15, the discharge device 11 is recharged by the source of potential 12, and, if the means 15 is again depressed, the signal device 10 again gives an indication. This, however, constitutes the placement of a second call.

When the called party answers, a switching means 22, which may be a part of the conventional telephone hook switch, for example, moves its contact arm 23 from its upper contact to its lower contact, thereby breaking the energizing circuit for the relay 14 and causing the make contact 21 of the switching means 20 to be opened by decoupling the electrical discharge device 11 and closing the break contact 19. However, when the break contact 19 is closed, the charging circuit for the electrical discharge device 11 is not reestablished, since the contact arm 23 now makes contact with the lower contact in the switching means 22 completing the circuit for a relay 25 through the potential source 16. When the relay 25 is energized, an armature 26 thereof is pulled inwardly to, either directly or through suitable mechanical linkage, open a break contact 28 of a swtching means 29, thereby opening the charging circuit for the electrical discharge device 11. Inward movement of the armature 26 of the relay 25 also closes a make contact 30 of the switching means 29 placing a suitable discharge resistance means 31 in shunt across the electrical discharge means 11 to fully remove the charge therefrom.

When the call registering means 15 is released, it reopens the circuit including the potential source 16 and the relay 25 dropping out that relay. The make contact 30 is then opened to permit the electrical discharge means 11 to be charged, an operation which can then be accomplished since the break contact 28 is restored to its normally closed position placing the potential source 12 in series circuit relation with electrical discharge device 11. As soon as the discharge device 11 has been fully charged, the system is ready for another signaling operation.

When the call has been completed, the switching arm 23 of the switching means 22 is returned to the upper contact to enable the relay 14 to be energized whenever the call registering means 15 is operated. It should be noted that upon the completion of the call, the signal device 10 cannot be operated in an annoying ring-back regardless of whether the called party or calling party causes the call to be terminated. To elaborate, if the calling party first causes the call registering means 15 to be released before the contact arm 23 of the switching means 22 is returned to its upper contact, the action described in the preceding paragraph takes place, charging the discharge device 11. The signal device 10 cannot be operated, however, since the switching means 20 is in the position shown in the figure due to the relay 14 being de-energized, thus preventing the discharge device 11 from discharging through the signal device. When the called party next causes the contact arm 23 of the switching means 22 to be returned to its upper contact, the relay 14 remains de-energized and the switching means 20 remains in the position shown, since the call registering means 15 is in the released position. The circuit is thus ready for another call. If, on the other hand, the called party first causes the contact arm 23 of the switching means 22 to be moved from its lower contact to its upper contact while the call registering means 15 is still closed, thereby energizing the relay 14 and causing the switching means 20 to couple the capacitor 11 across the signal device 10, the signal device is not operated since the discharge device is not charged due to the action of the relay 25 described two paragraphs above. When the calling party next causes the call registering means 15 to be released, the relay 14 is de-energized, returning the discharge device 11 to the charging circuit and rendering the circuit ready for another call.

Thus there has been provided, in accordance with the invention, a novel and improved signal control system for controlling a signal device for indicating a call to a called party, which is initially operated at the time that the call is placed, but does not continue to operate to the annoyance or distraction of the called party.

It will be understood by those skilled in the art that the above described embodiment is meant to be merely exemplary and that it is susceptible of modification and variation without departing from the spirit and scope of the invention. For example, while the relays 14 and 25 perform their intended function through their energization by closure of the call registering means 15, other initiating and maintaining circuitry may be used. Therefore, it is deemed that the invention is not to be limited except as defined in the appended claims.

We claim:

1. A signal control system for controlling a signal control device for indicating a call to a called party, comprising selectively operable electrical discharge means, a signal device adapted to be selectively coupled to said electrical discharge means for indicating a call in response to the discharge of said electrical discharge means, and call registering means under the control of the calling party for coupling said electrical discharge means to said signal device for effecting a single discharge during the pendency of said coupling.

2. A signal control system for controlling a signal device for indicating a call to a called party, comprising selectively operable electrical discharge means, an electrical discharge responsive signal device adapted to be selectively coupled to said electrical discharge means for indicating a call, a charging circuit for said electrical discharge means, means for placing said electrical discharge means in charging relation in said charging circuit, and call registering means under the control of the calling party for disconnecting said electrical discharge means from said charging circut and coupling said electrical discharge means to said signal device to discharge said electrical discharge means into said signal device to operate said signal device only once during the pendency of said coupling.

3. A signal control system for controlling a signal control device for indicating a call to a called party under the control of the calling and called parties, comprising a signal device for indicating a call, selectively operable electrical discharge means adapted to be selectively coupled to said signal device for controlling said signal device, call registering means under the control of the calling party for coupling said discharge means and said signal device to render said discharge means operative to control said signal device to indicate a call, means responsive to said call registering means for preventing further operation of said signal device after an initial operation thereof during the pendency of said coupling, means operable when the called party answers the call and responsive to said call registering means for discharging any electrical charge remaining on said electrical discharge means.

4. A signal control system for controlling a signal device for indicating a call, comprising a signal device, selectively operable electrical discharge means for controlling said signal device and adapted to be coupled thereto, a charging circuit for said selectively operable electrical discharge means, relay operated switching means for selectively and alternatively connecting said electrical discharge means in said charging circuit and for coupling said electrical discharge means to said signal device for effecting a single discharge during the pendency of said coupling, an energizing circuit for said relay operated switching means, and call registering means under the control of the calling party for controlling the completion of said energizing circuit.

5. A signal control system for controlling a signal device for indicating a call to a called party under the control of the calling and called parties comprising a signal device for indicating a call, selectively operable electrical discharge means for controlling said signal device by electrical discharge, a charging circuit for said electrical discharge means, first relay operated switching means for selectively and alternatively connecting said electrical discharge means in said charging circuit and for coupling said electrical discharge means to said signal device, an energizing circuit for said first relay operated switching means, call registering means under the control of the calling party for controlling the completion of said energizing circuit for said first relay operated switching means, an electrical discharge circuit, second relay operated switching means for selectively connecting said electrical discharge means in said electrical discharge circuit and for interrupting said electrical charging circuit, an energizing circuit for said second relay operated switching means, and switching means responsive to the completion of a call between the called and calling parties for selectively and alternatively connecting said call registering means in said energizing circuit for said first relay operated switching means and said energizing circuit for said second relay operated switching means.

6. A signal control system for controlling a signal device for indicating a call, comprising a signal device, electrical discharge means for controlling said signal device, a charging circuit for charging said electrical discharge means, switching means for selectively and alternatively connecting said electrical discharge means in said charging circuit and for coupling said electrical discharge means to said signal device, call registering means under the control of the calling party for operating the switching means to couple said electrical discharge means to said signal device to discharge said electrical discharge means into said signal device to indicate a call, first means operable during the answering of the call by the called party for operating said switching means to connect said electrical discharge means in said charging circuit, and second means responsive to said first means and said call registering means for preventing the charging of said electrical discharge means by said charging circuit.

(References on following page)

References Cited by the Examiner

UNITED STATES PATENTS

| | | | |
|---|---|---|---|
| 923,499 | 6/09 | Davenport | 179—84 |
| 1,211,274 | 1/17 | Bascom | 179—84 |
| 1,942,811 | 1/34 | Green | 340—328 |
| 2,069,915 | 2/37 | Edwards et al. | 179—86 |
| 2,152,475 | 3/39 | Halligan | 179—18 |
| 2,260,524 | 10/41 | Hersey | 340—328 |
| 2,302,544 | 11/42 | Halligan | 179—84 |
| 2,481,840 | 9/49 | Hardgrave | 179—84 |
| 2,914,747 | 11/59 | Straube | 340—155 |

ROBERT H. ROSE, *Primary Examiner.*

L. MILLER ANDRUS, WALTER L. LYNDE, *Examiners.*